United States Patent
Chalasani et al.

(10) Patent No.: US 8,140,677 B2
(45) Date of Patent: Mar. 20, 2012

(54) AUTONOMIC WEB SERVICES HOSTING SERVICE

(75) Inventors: Nanchariah Raghu Chalasani, Fairfax, VA (US); Quddus Chong, Kansas City, MO (US); Dolapo Martin Falola, RoundRock, TX (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2028 days.

(21) Appl. No.: 10/301,074

(22) Filed: Nov. 21, 2002

(65) Prior Publication Data

US 2004/0103195 A1  May 27, 2004

(51) Int. Cl.
    *G06F 15/173* (2006.01)
(52) U.S. Cl. ......... 709/226; 709/221; 709/224; 714/4.1; 714/15
(58) Field of Classification Search ............... 709/221, 709/226, 224; 714/4, 15
    See application file for complete search history.

(56) References Cited

U.S. PATENT DOCUMENTS

| | | | |
|---|---|---|---|
| 5,173,689 A | | 12/1992 | Kusano ........................ 340/827 |
| 5,987,621 A * | | 11/1999 | Duso et al. .................... 714/4.11 |
| 6,330,689 B1 * | | 12/2001 | Jin et al. ........................... 714/15 |
| 6,446,200 B1 * | | 9/2002 | Ball et al. .......................... 713/1 |
| 6,901,442 B1 * | | 5/2005 | Schwaller et al. ............ 709/224 |
| 7,730,172 B1 * | | 6/2010 | Lewis ............................ 709/224 |
| 2002/0007468 A1 * | | 1/2002 | Kampe et al. .................... 714/4 |
| 2005/0015643 A1 * | | 1/2005 | Davis et al. ...................... 714/4 |

FOREIGN PATENT DOCUMENTS

| | | |
|---|---|---|
| WO | WO 02/01347 | 1/2002 |
| WO | WO02/01347 A2 * | 1/2002 |
| WO | WO 02/01347 A2 * | 1/2002 |
| WO | WO 0201347 A2 * | 1/2002 |

OTHER PUBLICATIONS

T. Wu, *A Passive Protected Self-Healing Mesh Network Architecture and Applications*, IEEE/ACM Transactions on Networking, vol. 2, No. 1, pp. 40-52, (Feb. 1994).
R. J. Abbott, *Resourceful Systems and Software Fault Tolerance*, ACM O-89791-271-3/88/0006, pp. 992-1000. (1988).
S. Han, et al., *Fast Restoration of Real-Time Communication Service from Component Failures in Multi-hop Networks*, Proc. of ACM SIGCOMM Symposium, vol. 27, No. 4, pp. 77-88, (Oct. 1997).

(Continued)

*Primary Examiner* — John Follansbee
*Assistant Examiner* — Dhairya A Patel
(74) *Attorney, Agent, or Firm* — Steven M. Greenberg, Esq.; Carey, Rodriguez, Greenberg & O'Keefe (57) ABSTRACT

An autonomic grid. The autonomic grid can include a multiplicity of hosting services communicatively coupled to one another. Each hosting service can include an administrative service configured to determine whether to deploy requested Web services locally or remotely; a code base for storing implementations of the requested Web services; and, a deployment service configured to deploy on command the implementations stored in the code base. Notably, at least one of the hosting services further can include one or more Web services instances; one or more monitors configured to proxy requests to and responses from the Web services instances; and, one or more agents subscribed to the monitors to analyze the requests to and responses from the Web services instances, and to provision Web services in others of the hosting services based upon the analysis.

13 Claims, 9 Drawing Sheets

OTHER PUBLICATIONS

Stelling, et al., *A fault detection service for wide area distributed computations*, Cluster Computing 2, pp. 117-128, (1999).

Ravindran, et al., *Resource Management Middleware for Dynamic, Dependable Real-Time Systems*, Real-Time Systems, vol. 20, pp. 183-196, (2000).

K. Janssen, et al., *Component Failure Detection Via State Estimation, A Bride Between Control Science and Technology*, IFAC Proc. Series, vol. 4, pp. 2213-2218, (1985).

Z. Medicoff, Businesses gird for grid computing breakthroughs, Globeandmail.com, Sep. 2002).

* cited by examiner

AUTONOMIC WEB SERVICES HOSTING SERVICE

BACKGROUND OF THE INVENTION

1. Statement of the Technical Field

The present invention relates to the provisioning of Web services and more particularly to an autonomic Web services hosting infrastructure.

2. Description of the Related Art

Web services have become a focal point of technical innovation and new business opportunity. In particular, Web services offer a solution to the interoperability problem for heterogeneous computing systems. Consequently, Web services technology promises to provide computing resources to end users distributed about the global computer communications network based upon a pay-per-use model. Still, the rate of adoption for Web services technology remains inhibited by the complexity involved in deploying new Web services. In particular, providers of Web services hold strong concerns in regard to the availability of deployed Web services.

Specifically, from the perspective of the Web services provider, the unexpected unavailability of a deployed Web service can translate in lost business revenues, though the unexpected unavailability can arise from an excess demand for the deployed Web service which exceeds the capacity of the Web services hosting environment. As a result, typical hosting environments are "over-engineered" to ensure redundancy, quality of service and high availability. Consequently, system engineers find themselves trying to master the delicate and often expensive balance between over-capacity and under-utilization.

To balance both the matter of over-capacity and under-utilization in a Web services hosting environment, typically a communication mechanism is disposed between the gateway nodes the provide the Web services, the Web service deployment agency, and the agency tasked with deciding when to provision a Web service, or to offload the provisioning of the Web service to another host. The communication mechanism can provide critical coordination between the nodes and the agencies so that the tasked agency can effectively balance capacity and utilization of Web services.

Aside from high-availability considerations relating to the capacity of the Web services hosting environment, availability issues also can arise from the failure or mal-operation of a deployed Web services. More particularly, distributed systems as a whole often suffer based upon the characteristics of an individual component. For instance, where one Web service experiences a heavy load or fails altogether, the quality of service (QoS) experienced about the entire distributed system can degrade in quality. Therefore, the more distributed a system, the more Important can be for the distributed system to be "autonomic".

In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

Conventional business models increasingly rely upon the use of Web services to maintain cross-platform compatibility, value-chain relationships, customer relationships, and partner relationships. With the rapid undertaking and deployment of Web services, however, focus has shifted to the interoperability of various Web services across the value chain. In furtherance of this effort, the Open Grid Services Architecture (OGSA) has been leveraged to address the problem of support and software maintenance among Web services components distributed about the Web services hosting environment.

Notably, the physiology of a grid mechanism through OGSA can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and Invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains.

While grid services can be configured to provide an enhanced utilization of computing resources, grid services heretofore have not been able to provide a differential utilization of computing resources. Varying levels of computing services can be provided based upon what has been referred to as a "policy based service differentiation model". In a policy based service differentiation model, the computing devices can offer many levels of service where different requests for different content or services which originate from different requestors receive different levels of treatment depending upon administratively defined policies. In that regard, a service level agreement (SLA) can specify a guaranteed level of responsiveness associated with particular content or services irrespective of any particular requestor. By comparison, quality of service (QoS) terms specify a guaranteed level of responsiveness minimally owed to particular requesters.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different security and service levels have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

The Web SLA (WSLA) is a proposed specification which defines a markup language for representing assertions by a service provider to guarantee a defined level of service. By comparison, WS-Policy is a proposed specification which provides a general purpose framework for describing and communicating policies and business rules associated with a Web service. As cross-enterprise technologies such as the Web service and the grid services mechanism adopt autonomic principals, the need exists to leverage business rules to govern the self-adapting nature of the Web services hosting environment. In particular, it would be preferable for a Web services hosting environment to be able to detect, in advance, the imminent inability of the Web services hosting environment to meet the contractual requirements of an SLA. In response, it would be preferable to the Web services hosting environment to autonomically heal itself and to undertake remedial measures so as to meet the contractual terms of the SLA.

SUMMARY OF THE INVENTION

A self-healing and self-optimizing grid architecture can be provided in accordance with the present invention. Specifically, the architecture can include a mechanism for detecting component failures, and even degraded component performance, within peer components in a hosting service. Once a failure has been detected, the detecting peer to undertake remedial action to recreate and redeploy the component in the hosting system. In particular, the detecting component can acquire the behavior of the failed component and the detecting component can instantiate an instance of the behavior in another server in the grid. Thus, the mechanism described herein can be analogized to biotechnical DNA as every component in the hosting service can maintain an awareness of the state of the entire system and can recreate the entire system through knowledge provided by grid services DNA.

An autonomic grid which has been configured in accordance with the inventive arrangements can include a multiplicity of hosting services communicatively coupled to one another. Each local hosting service can include an administrative service configured both to communicate capability information about the local hosting service to others of the hosting services, and also to determine whether to deploy requested Web services locally or remotely; a code base for storing implementations of the requested Web services; and, a deployment service configured to deploy on command the implementations stored in the code base. Notably, at least one of the hosting services further can include one or more Web services instances; one or more monitors configured to proxy requests to and responses from the Web services instances; and, one or more agents subscribed to the monitors to analyze the requests to and responses from the Web services instances, and to provision Web services in others of the hosting services based upon the analysis.

Notably, at least one of the hosting services further can include an advertising service configured to advertise to others of the hosting services the capabilities of the hosting services. The advertising service can be included as part of the administrative service, or the advertising service can be separately operable from the administrative service. At least one of the agents can include a WSLA agent configured to provision individual ones of the Web services in particular ones of the hosting services according to the terms of at least one WSLA associated with the individual ones of the Web services.

Finally, it should be noted that the Web services can be wrapped with grid service instrumentation so as to be interoperable with the autonomic grid of the present invention. More particularly, the grid-wrapped Web services can provide the monitoring and instrumentation capability in an autonomic fashion. The wrapping aspect enables agents to subscribe to the service for the purpose of monitoring the activities of the wrapped Web service. The wrapping aspect also enables the Web service to send notifications to subscribers. In terms of functionality, the grid wrapped Web service can include its base Web service functionality, the ability to service as a notification source, and the ability to send notifications of monitored conditions to subscribers, such as response time, invocations and the like.

A method of deploying a Web service in an autonomic grid can include detecting in a local hosting service a request to invoke a Web service instance. Responsive to the detection, it can be determined in the local hosting service whether to permit the invocation in the local hosting service, or whether to provision the requested Web service instance in a peer hosting service. If it is determined to provision the requested Web service instance in a peer hosting service, a peer hosting service can be seleted and it can be requested that the selected peer hosting service deploy the requested Web service instance in the selected peer hosting service.

In one aspect of the invention, the detecting step can include coupling a monitor associated with a Web service instance to an agent configured to perform the determining, selecting and requesting steps. Also, a request can be detected to invoke the Web service instance in the monitor. Upon detection, the monitor can notify the coupled agent of the detection. The selecting step, by comparison, can include monitoring capability assertions received from peer hosting services in the grid and evaluating the assertions against criteria established for model hosting services. In consequence, a candidate list can be created of peer hosting services based upon the evaluation.

Subsequently, performance metrics can be measured for selected ones of the Web service instances; and, for each selected Web service instance, the measured metrics can be compared to specified metrics in a corresponding WSLA. Based upon the comparison, it can be computed whether the selected Web service instance has an operable performance likely to breach terms of the WSLA. If it is determined that the selected Web service instance has an operable performance likely to breach the terms of the WSLA, the selected Web service can be provisioned in a hosting service deemed likely to have an operable performance not likely to breach terms of the WSLA.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

I. Overview

The present invention is an autonomic Web services hosting infrastructure. In accordance with the present invention, grid services DNA can be associated with hosting service components in the grid. The grid services DNA can describe enough fundamental elements of associated hosting service components so that other components in the grid can provision a duplicate replacement component by reference to the grid services DNA alone. In consequence, the use of decentralized grid services DNA in the grid architecture of the present invention can provide for an enhanced autonomic behavior, in particular, self-healing.

As a further aspect of the present invention, individual hosting services in the grid architecture can advertise capabilities to peer hosting services in the grid so as to provide an awareness among peer hosting services of the hosting capabilities of other peers. Using this awareness, agents within individual hosting services can intelligently and autonomically provision Web service instances in remote hosting services based upon the knowledge of the capabilities of peer hosting services. Using this knowledge, specifically configured WSLA agents can detect impending breaches of SLA relationships and, in response, the WSLA agents can provision Web services instances in peer hosting services based upon the knowledge of the capabilities of the peer hosting services.

II. A Decentralized Self-Healing Grid Architecture

It has been observed that living organisms include a mechanism in which information can be stored from which cellular components can be replicated without limitation. Specifically cellular DNA can store a genetic blueprint of the living organism able to guide the construction of the cellular components of the living organism. In accordance with the present invention, an analogous technical blueprint, referred to hereinafter as a grid services distributed network agreement (grid services DNA), can provide a specification of the state and composition of the grid architecture. More particularly, the grid services DNA can describe the technical attributes, state and other characteristics of the grid architecture.

Figure 1:
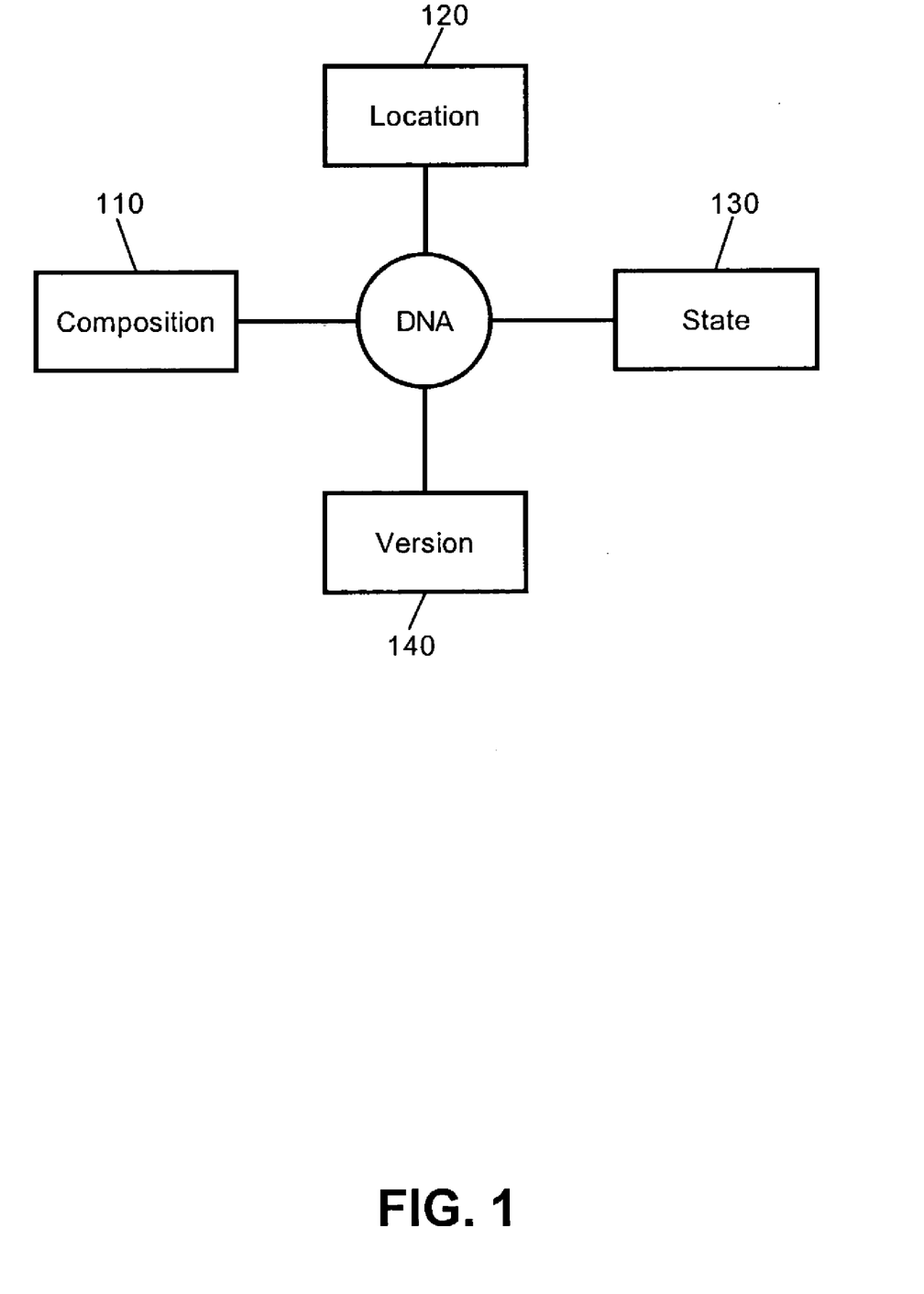
FIG. 1 is a block illustration of the grid services DNA of the present invention.

FIG. 1 is a block illustration of the grid services DNA of the present invention. As shown in FIG. 1, the grid services DNA can include a specification of composition 110, location 120, state 130 and version 140. The composition 110 can specify the components forming the Web services system. Specifically, the components can be referenced as "behaviors" whose composition forms the overall functionality of the Web services system. The location 120, in contrast, can specify the location of the implementation of each behavior in the system, the location of instances of the behaviors, and the location of physical resources in which the instances can be created.

The state 130 can provide a location from which individual component state information and meta-data can be retrieved. In that regard, the state represents information in the component that must be persisted across deployment instances. Examples can include the capacity and performance of each component, the configuration of the component and the capabilities of the component. Finally, the version 140 can specify the version of the grid services DNA.

Figure 2:
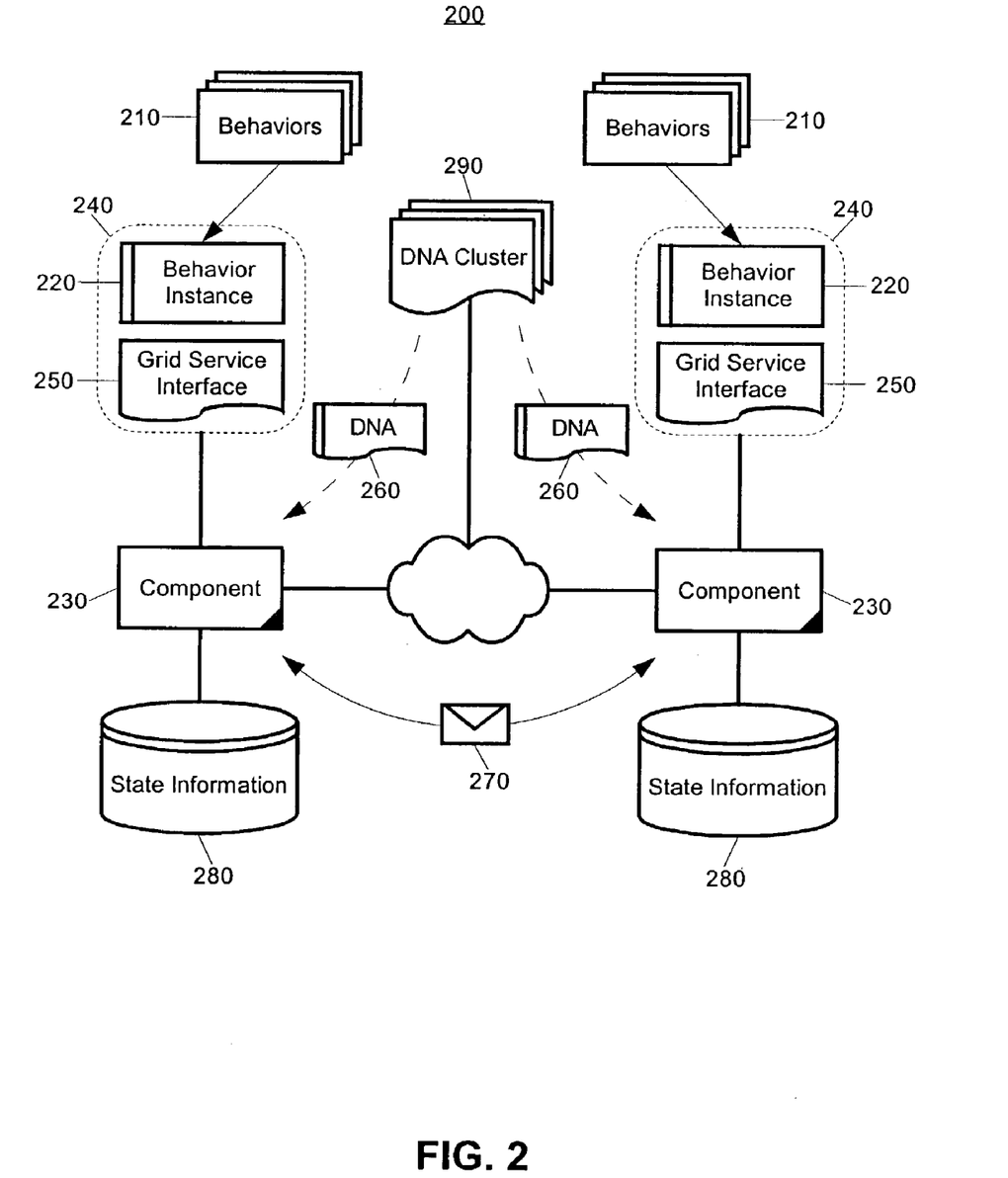
FIG. 2 is a schematic illustration of a grid architecture which has been configured to support grid services DNA.

FIG. 2 is a schematic illustration of a grid architecture which has been configured to support grid services DNA. In the grid architecture 200, a distinction can be made between individual behaviors 210 (implementations) and instances 220 of the behavior implementations. Components 230 in the grid architecture 200 which have been configured to interoperate with grid services DNA are able to dynamically access the functionality and data of a behavior instance 220, or to create an instance 220 of the behavior from a behavior 210. In either case, the behaviors 210 in the grid can be exposed as individual grid services 240 by creating an interface 250 to the individual behaviors 210 and by publishing the interfaces as 250 WSDL documents. Inasmuch as the location of each behavior 210 can be stored in grid services DNA 260, any component 230 in the grid 200 can access the behavior 210 of any peer component 230 by referencing the grid services DNA 260 of the behavior 210.

Components 230 in the self-healing architecture 200 of the grid can detect a malfunction in any portion of the architecture. Specifically, components 230 can exchange with one another periodic status messages 270 with other components 230 in order to make each component 230 aware of the status of their peers. Ordinarily, the length of time taken to receive a response to a status invocation, or a lack of a response altogether, can serve as indication that a component 230 may have failed. A delayed or absent response can indicate that a failing component ought to be re-deployed elsewhere in the grid. Alternatively, the delayed or absent response can be indicative of the need to optimize or repair the system as a whole.

Each component 230 in the system can persist serialized state information 280 to a location specified by the grid services DNA 260. For example, the OGSA ServiceData schema can be used as a formal specification of the format of the state information. In the event of detecting a component failure, a recreated instance of the component 230 can be restored to a pre-failure state. Coupled with the ability of the component 230 to acquire a particular behavior 210 of another component 230, state restoration as described herein allows for the replacement of a failed behavior instance 220 that can continue to serve the functionality of the component 230, thus providing reliability to users of the network. Importantly, it is not required that the state information be stored to a single location. Rather, fail-safe persistent storage mechanisms such as that provided by conventional database technology or enterprise Java beans can be leveraged for this purpose.

Importantly, it will be apparent to one skilled in the art that by deploying grid services DNA 260 for components 230 in the grid architecture 200, it can become necessary to store the grid services DNA 260 in a convenient, accessible manner so that all components 230 in the grid 200 can rapidly and reliably access information contained in the grid services DNA 260. At one extreme (not illustrated), an entire set of all grid services DNA can be copied to each host in the grid, albeit such a solution could be unwieldy quickly. Additionally, where multiple sets of grid services DNA are distributed about the grid, data synchronization problems can arise, such as the case where different sets of grid services DNA directed to identical components in the grid provide disparate information.

Consequently, it can be helpful in the grid architecture of the present invention to store the grid services DNA 260 as shown in FIG. 2 in a cluster of servers 290 upon which the components 230 of the grid 200 can rely when seeking any particular grid services DNA 260 in accordance with the inventive arrangements. When a component 230 in the grid 200 detects a failure requiring the component 230 to access the grid services DNA 260 associated to undertake state restoration, the responding component 230 need only request the grid services DNA 260 from the server cluster 290. Thus, by deploying a cluster of servers 290 which is smaller than the total number of servers in the, the problem of synchronizing sets of grid services DNA can be remediated somewhat.

Still, in the case of a cluster of servers managing mirror image sets of grid services DNA can remain problematic where the configuration of the components change more frequently than not. In that case, the set of grid services DNA can be stored in a central repository (not illustrated) such as a network-accessible database. Conventional database technology already accounts for fault tolerance and fail-over scenarios. Also, the use of a central repository handily addresses the issue of contention between competing sets of grid services DNA.

The grid services DNA 260 of the present invention can include necessary and sufficient information needed to recreate the entire system of components 230 in the grid 200 in case of a failure. Likewise, the grid services DNA 260 associated with any one failed component or components in the grid can assist a responsible component which detects the failure in initiating the self-healing architecture. In this regard, the failed component or components, in the aggregate, can be viewed as a resource or managing entity, often referred to as a "hosting service".

A hosting service is the managing entity for a collection of Web services. The hosting service is the logical model of grid service components in a Web service hosting environment that can monitor Web service sessions, make provisioning decisions, communicate with peer hosting services, and deploy Web services on request. In a preferred aspect of the present invention, each hosting service component in the hosting service can be a grid service described using WSDL and invoked, for example, over SOAP. Moreover, the hosting service components can be physically running under the same server, or the hosting service components can be distributed over a network. In either case, the hosting services form the nodes of the autonomic grid of the present invention.

Figure 3:
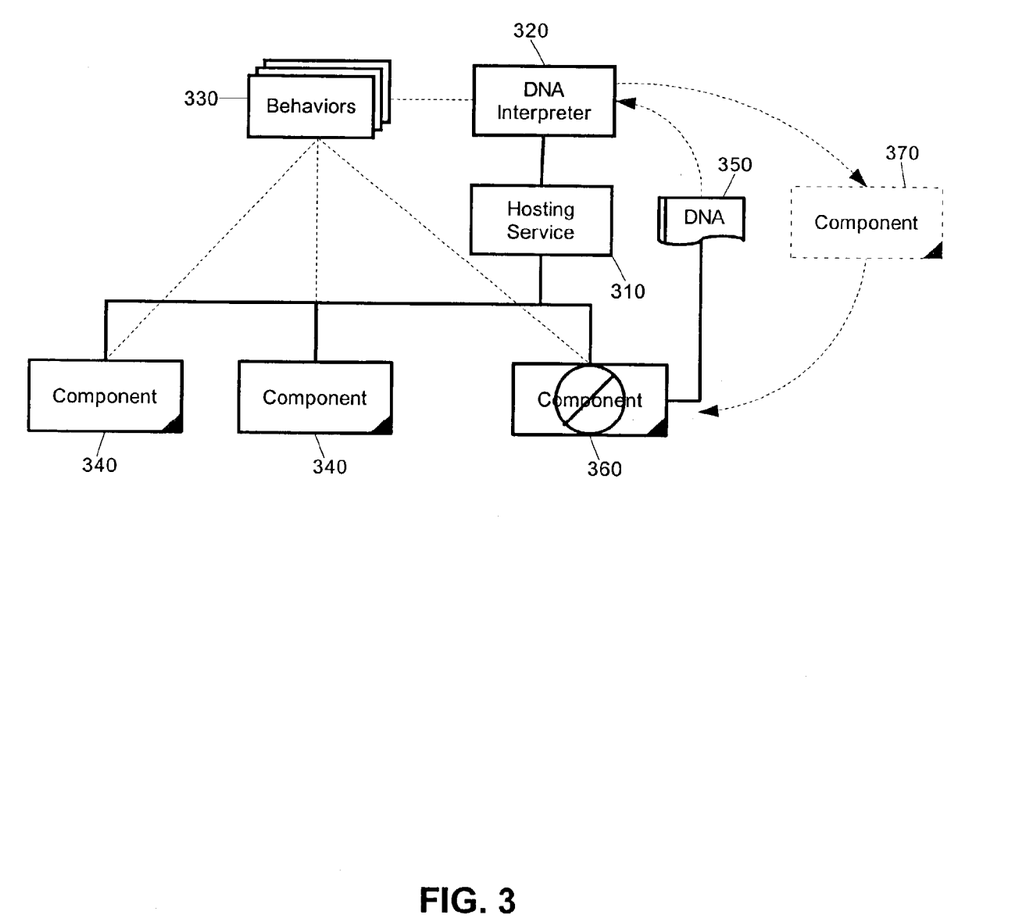
FIG. 3 is a block diagram illustrating the configuration of a hosting service to interoperate with the grid services DNA of the present invention.

FIG. 3 is a block diagram illustrating the configuration of a hosting service to interoperate with the grid services DNA of the present invention. Referring now to the hosting service 310, during the bootstrap process a grid services DNA interpreter 320 can be used to link the created hosting service 310 with its corresponding behavior 330. This linkage can be performed synchronously for every hosting service component 340. Once the linkage has been completed, the grid services DNA interpreter 320 can sign-off from the bootstrap process by sending an updated copy of the grid services DNA 350 to the components 340 of the hosting service 310 as confirmation to the components 340 that the hosting service 310 is properly executing and available for access.

When activated, the grid service DNA interpreter 320 upon detecting a failure in a particular component 360 of the hosting service 310 can interpret the grid services DNA 350 associated with the failed component 360 of the hosting service 310 to re-create an instance 370 of the failed component 360. Moreover, the grid service DNA interpreter 320 can ensure that the re-created hosting service component 370 exhibits a requisite level of operation, that the components 340 of the hosting service 310 possess a copy of the grid services DNA 350, and that communication links have been established between all requisite components 340.

As a more specific example, in operation, when a component in the grid detects a failure in a peer, the component can attempt to re-deploy the failed peer in another host. Specifically, when a component detects a failure in a peer, the component can provide and alert to other functioning peers of the detected failure, in addition to a timestamp, and an indication of an intent to re-deploy the failed peer to a different host. Upon receiving acknowledgments to the alert from the other functioning peers, the component can redeploy the failed peer to another host.

It will be recognized by the skilled artisan that multiple components in the grid can detect the failure in the peer. In consequence, a two-phase commit approach can be used to prevent multiple components from re-deploying the same failed peer to a different host. For instance, where multiple components have detected the failed peer, only the component which provided the earliest timestamp in the alert can re-deploy the failed peer. In this way, multiple components can be prevented from re-deploying the same failed peer to a different host.

Figure 4:
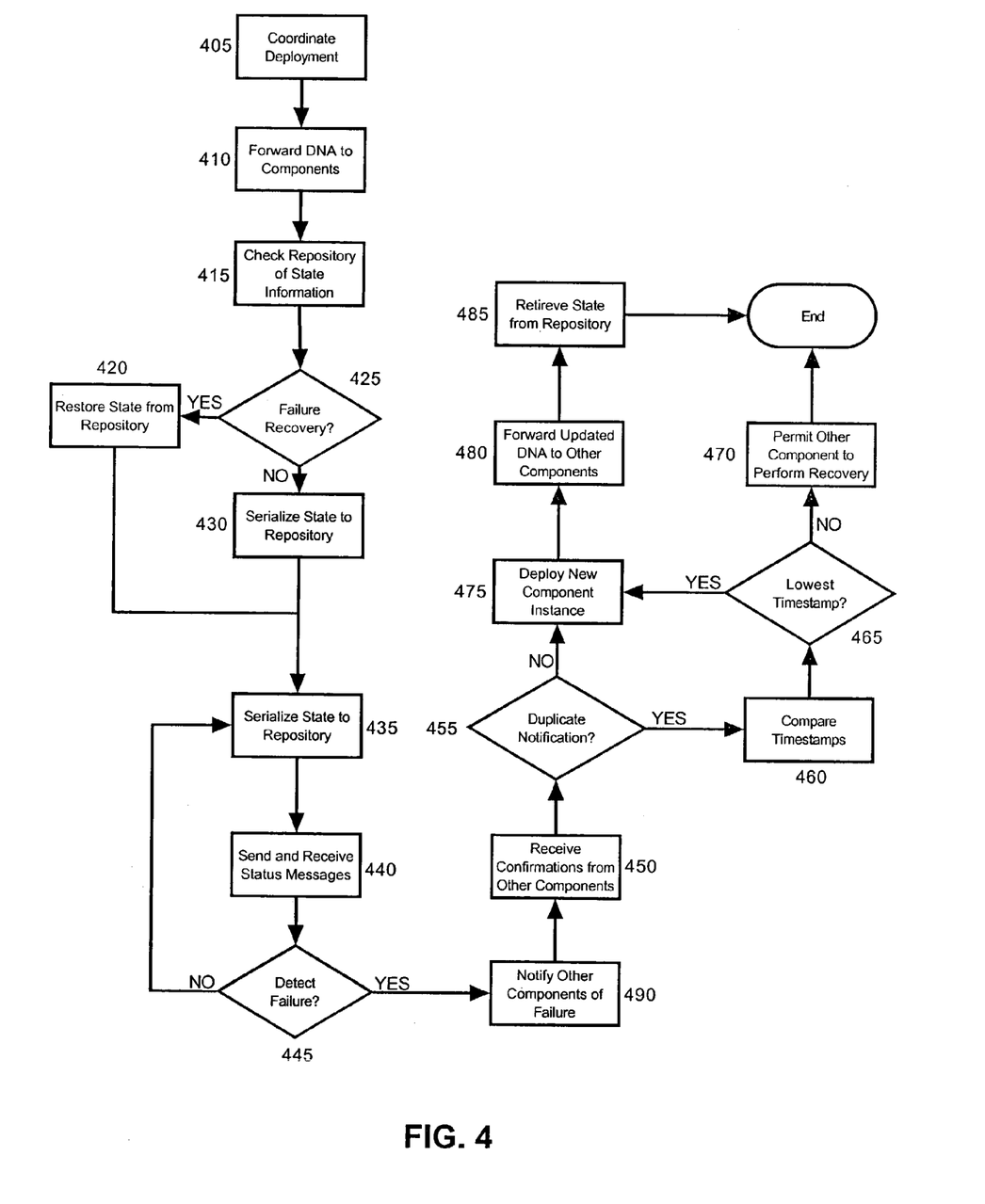
FIG. 4 is a flow chart illustrating a process for autonomically deploying a hosting service environment in the grid architecture of the present invention.

FIG. 4 is a flow chart illustrating a process for autonomically deploying a hosting service environment in the grid architecture of the present invention. Beginning in a bootstrap process of blocks 405 through 430, an administrator client can be started with information about which server or servers will host the components of the hosting service, as well as what behaviors will be combined to form the hosting service. A grid services DNA interpreter component in the server can coordinate the synchronous deployment of the components. The current grid services DNA can be forwarded to all components so that the components can begin normal operation. Finally, each component can check a repository of state information to ensure that the respective component has not experienced a failure. If a component has experienced a failure, its state can be restored using serialized state information stored in the repository. Otherwise, the state of the component can be serialized to the repository.

In a steady-state process illustrated in blocks 435 through 445, each component can serialize its state to the repository in a periodic manner. In particular, each respective component can serialize its state to a repository location specified in the grid service DNA associated with the respective component. From time to time, each component can send and receive status messages to others of the components in the hosting service. The availability, and conversely a failure, of the other components can be determined from the latency in responding to the status messages by the other components.

In block 490, if a failure is detected in a particular component, the particular component can notify the other components in the hosting service of the failure. Notably, the notification can include a timestamp. In block 450, the particular detecting component can receive confirmation from the notified components to proceed with a recovery operation. In block 455, if the component receives a duplicate failure notification from one or more other components, in block 460, the component can compare all timestamps to determine which component can handle the recovery operation. For example, in block 465, if the component does not have the lowest timestamp, in block 470 the component can permit another component to handle the recovery operation.

If, however, in block 465 the component does have the lowest timestamp, in block 475 the component can deploy a new instance of the failed component to another server in the grid. Also, the grid services DNA associated with the failed component can be updated to reflect the new instance of the failed component. In block 480, the updated grid services DNA can be forwarded to all peer components in the hosting service. Finally, in block 485 the redeployed component can retrieve its state from the repository specified by the grid services DNA.

Significantly, one skilled in the art will recognize that the self-healing and self-optimizing grid architecture provides a mechanism for detecting component failures, and even degraded component performance, within peer components in a hosting service. Once a failure has been detected, the detecting peer to undertake remedial action to recreate and redeploy the component in the hosting system. In particular, the detecting component can acquire the behavior of the failed component and the detecting component can instantiate an instance of the behavior in another server in the grid. Thus, the mechanism described herein can be analogized to biotechnical DNA as every component in the hosting service can maintain an awareness of the state of the entire system and can recreate the entire system through knowledge provided by the grid services DNA.

III. Autonomic Web Service Provisioning in the Grid

In accordance with the principals of autonomic computing, the grid hosting services environment of the present invention not only is self-healing, but also the grid hosting services environment can be self-managing. Specifically, in the hosting services environment of the present invention, a de-centralized peer-to-peer communications model can be deployed over which individual hosting services can communicate their respective availability to other hosting services for hosting new instances of a requested Web service. In consequence, the grid architecture of the present invention can provide autonomic Web service creation based upon the availability of any one of the hosting services in the grid.

Figure 5:
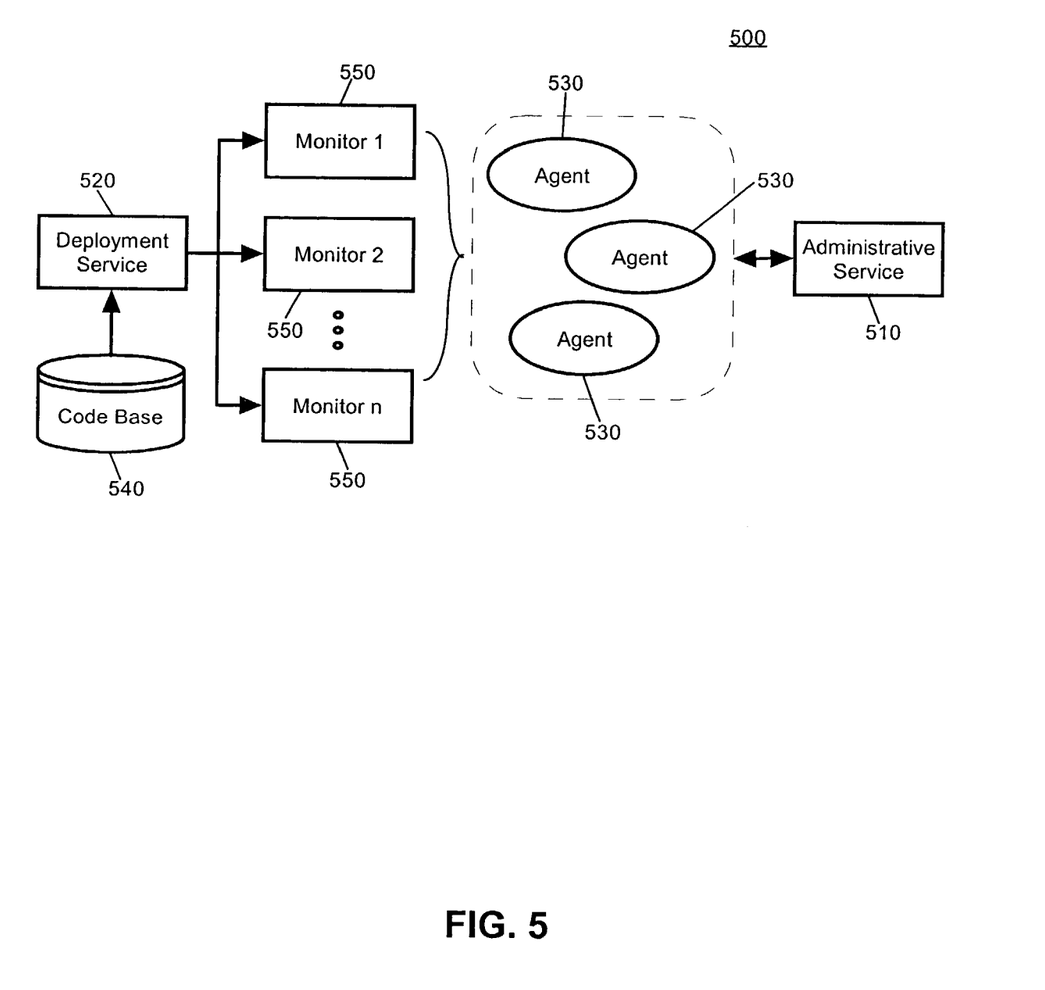
FIG. 5 is a schematic illustration of a hosting service which has been configured to perform autonomic Web service provisioning in the grid of the present invention.

FIG. 5 is a schematic illustration of a hosting service which has been configured to perform autonomic Web service provisioning in the grid of the present invention. Specifically, the hosting service 500 can include an administrative service component 510, a deployment service component 520, one or more agent components 530, a code base 540 and one or more monitor components 550. In operation, the administrative service 510 can receive requests from a foreign hosting service, or an administrative client to deploy a particular Web service. The administrative service 510 can determine whether the request can be satisfied locally, and if so, the administrative service 510 can instruct the local deployment service 520 to deploy the particular Web service.

Upon command, the deployment service component 520 can retrieve the source code for the particular Web service from a selected location in a code base 540. Additionally, the deployment service component 520 can add grid service functionality to the retrieved source code and the deployment service component 520 can recompile the source code to produce a wrapped Web service. Finally, the deployment service component 520 can deploy the wrapped Web service and the deployment service component 520 can associate the wrapped Web service with a grid service proxy referred to herein as a monitor component 550. Notably, the hosting service 500 can host any type of Web service so long as the Web service can be wrapped with suitable instrumentation and associated with a monitor component 550.

By establishing a monitor component 550 for every Web service deployed, the state of the Web service instance can be monitored in terms of external invocations, response time, and the source of invocation requests. The metrics compiled by the monitor component 550 can be used by the agents 530 in performing intelligent provisioning. Specifically, each monitor component 550 can notify the agents 530 whenever external clients invoke the services of a corresponding wrapped Web service. Each agent 530 can determine whether to provision a Web service based upon internal provisioning rules and the metrics forwarded to the agent 530 by the corresponding monitor component 550. If it is determined that a Web service should be provisioned, the agent 530 can remotely send a deployment request to the administrative service 510. The administrative service 510, in turn, can decide whether to deploy the Web service locally or remotely in addition to communicating capability information regarding the hosting service 500 to other hosting services in the grid. Importantly, a startup process for the hosting service 500 can make use of the deployment capability, so that an administrator client can request that an unutilized hosting service deploy and begin to host an initial collection of Web services.

Notably, any Web service hosted within the hosting service 500 can be grid-enabled at deploy-time. Using the original Web service implementation code stored in the code base 540, the deployment service can generate and compile a new class that can wrap the core Web service with additional grid service functionality. The grid specific functions that can be added can include, for example, operations that enable communication on the grid and operations that enable the storing of state information at run-time. Significantly, one skilled in the art will recognize that adding grid functionality to a Web service provides for more efficient service publishing, binding and discovery. Moreover, the grid administrative service can deploy Web services with an expiration timer, to ensure that deployed Web services do not become stale.

Grid enabled Web services also can make use of lifetime management specific grid functionality such as calling an explicit destruction request upon itself. Binding, similarly, can be more efficient in the grid context because the code base can store differing versions of the same Web service, each version having a specific optimization for particular hosting service configurations. Also, improved discovery of deployed Web services can be enabled through the use of the grid infrastructure's decentralized subscription and advertising mechanism, making each hosting service a portal to information about Web services availability throughout the grid. Finally, because the grid infrastructure operates on an application layer, deploying Web services in the grid can require the use merely of the same underlying mechanisms for all Web services, thereby greatly simplifying the process of deploying disparate Web services.

Figure 6:
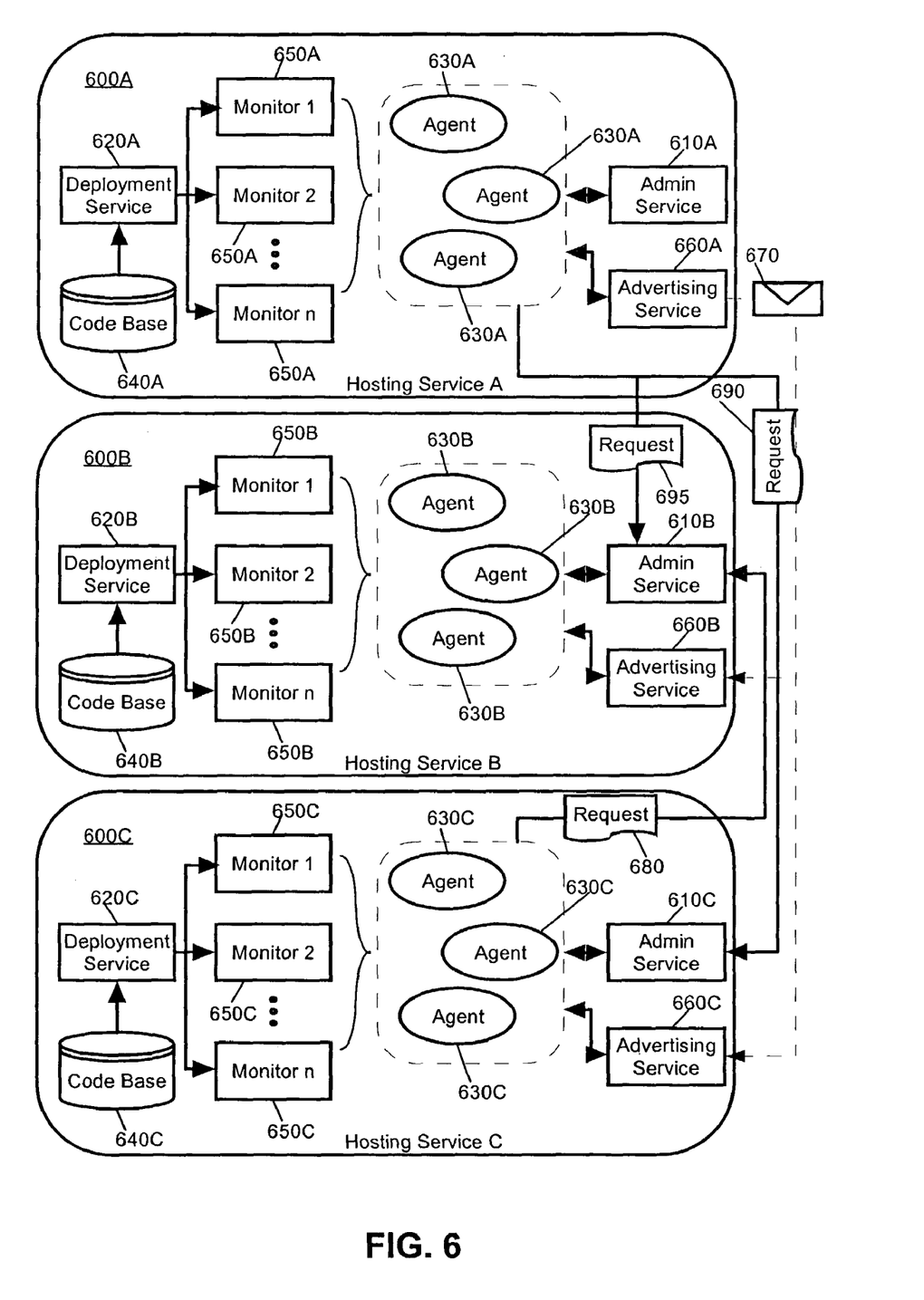
FIG. 6 is a schematic illustration of an autonomic grid infrastructure configured for decentralized, on-demand Web service provisioning.

FIG. 6 is a schematic illustration of an autonomic grid infrastructure configured for decentralized, on-demand Web service provisioning. Importantly, the autonomic grid Infrastructure can include two modes through which availability information can be exchanged among hosting services. For example, the hosting service 600A can notify other hosting services 600B, 600C of the hosting service's 600A hosting capabilities by exchanging advertisements 670 with the other hosting services 600B, 600C in the grid. In one aspect of the invention, the advertisements 670 can be exchanged through a publish-subscribe paradigm, though the invention is not so limited to any one communication mode between the respective hosting services 600A, 600B, 600C.

In accordance with the inventive arrangements, when an agent 630A, 630B, 630C a particular one of the hosting services 600A, 600B, 600C has information which ought to be communicated with other peer hosting services 600A, 600B, 600C, the information can be "wrapped" by a corresponding advertising service 660A, 660B, 660C and forwarded to other advertising services 660A, 660B, 660C in other respective peer hosting services 600A, 600B, 600C. Conversely, the administrator service 610A, 610B, 610C can "unwrap" received advertisements 670 and can forward the packaged information to the respective agents 630A, 630B, 630C. Finally, the hosting service administrator service 610A, 610B, 610C in each respective hosting service 600A, 600B, 600C can compile capability notifications from agents 630A, 630B, 630C in others of the hosting services 600A, 600B, 600C.

It will be recognized by one skilled in the art that while FIG. 6 includes advertising services 660A, 660B, 660C which remain functionally separate from the administrator service 610A, 610B, 610C, the invention is not so limited. Rather, as the communication of capability information of the local hosting service to other hosting services is a behavior unto itself, the administrative service 610A, 610B, 610C can undertake the advertising responsibilities of the advertising service 660A, 660B, 660C. In that sense, though not illustrated in FIG. 6, the advertising service 660A, 660B, 660C can be included as part of the administrative service 610A, 610B, 610C.

Notably, the capabilities packaged within advertisements 670 can be broadcast at periodic intervals to subscribing ones of the hosting services 600A, 600B, 600C. The peer hosting services 600A, 600B, 600C also can specifically request state data from selected ones of other hosting services 600A, 600B, 600C, for instance using the FindServiceData mode of the grid architecture. In that case, using the FindServiceData operation, a ServiceData notification can be "pulled" with the stored state information for the target hosting service. In this way, the administrator service 610A, 610B, 610C can build a log of candidate hosting services which can be used during the Web service provisioning process.

As will be recognized by one skilled in the art, provisioning is the act of deploying a Web service into a separate hosting service so that future requests for the Web service can be offloaded from a local hosting service to a remote hosting service. In the autonomic grid infrastructure of the present invention, each hosting service 600A, 600B, 600C can determine whether a Web service ought to be available in another one of the hosting services 600A, 600B, 600C in order to meet a higher demand for service, for instance. More particularly, each hosting agent 630A, 630B, 630C can indicate whether provisioning should be performed based upon localized criteria.

For example, a CPU utilization agent active in a local hosting service can monitor the CPU utilization of a host computing platform. Based upon measured metrics, the CPU utilization agent can indicate that provisioning should be performed when the CPU utilization agent detects that the CPU utilization of the hosting service has exceeded a fixed threshold limit. Once it is determined that provisioning should occur, the CPU utilization agent can select a candidate peer hosting service from an internally maintained list to which a deploy request message can be forwarded to an administrator service residing therein.

Referring again to FIG. 6, for instance, each hosting service 600A, 600B, 600C can maintain a listing of candidate hosting services to which Web service deployment requests can be forwarded. Specifically, the agents 650A, 650B, 650C can monitor the capability assertions contained in received advertisements 670. A set of criteria can be compared against the assertions to identify hosting candidates. In consequence, a list of able hosting service candidates can be stored and maintained. Subsequently, the monitors 650A, 650B, 650C can monitor incoming Web service invocations while notifying the agents 630A, 630B, 630C with updates.

The agents 630A, 630B, 630C, in turn, upon receiving an update from a monitor 650A, 650B, 650C, can evaluate the update against past Web service invocations. Based upon this evaluation, the agents 630A, 630B, 630C can determine whether or not to provision the Web service in a remotely positioned one of the hosting services 600A, 600B, 600C. If the agents 630A, 630B, 630C decide to provision the Web service in a remotely positioned one of the hosting services 600A, 600B, 600C, the respective agents 630A, 630B, 630C can transmit a deployment request 690 to the selected one of the remotely positioned hosting services 600A, 600B, 600C.

Upon receiving a deployment request 690, the administrator service 610A, 610B, 610C can determine the feasibility of hosting the requested Web service locally. For example, the computing resources of the host can be inspected to determine whether excess computing capacity remains available to support the hosting of the requested Web service. In any case, if the administrator service 610A, 610B, 610C determines that it will be feasible to host the requested Web service, the administrator service 610A, 610B, 610C can request that the respective deployment service 620A, 620B, 620C retrieve the Web service implementation source code from the corresponding code base 640A, 640B, 640C. The deployment service 620A, 620B, 620C can deploy the requested Web service with a corresponding monitor 650A, 650B, 650 and the components of the hosting service 600A, 600B, 600C can be notified of the newly deployed Web service.

In the example shown in FIG. 6, it will be clear to the skilled artisan that the Hosting Service C 600C can determine that resources are not available for the Hosting Service C 600C to host a new invocation of a particular Web service.

Thus, the agent 630C can request that the Hosting Service B 600B provision the particular Web service. Concurrently, the Hosting Service A can determine that resources are not available for the Hosting Service A 600A to host a new invocation of the particular Web service. Thus, the agent 630A can request that the Hosting Service C 600C provision the particular Web service. Yet, the Hosting Service C 600C can reject this request causing the agent 630 to re-request that the Hosting Service B 600B provision the requested Web service.

One skilled in the art will recognize that the autonomic grid infrastructure of the present invention provides a lightweight, yet robust system for grid-enabling existing Web services. Additionally, intelligent load balancing can be facilitated through the ability of the hosting services to provision Web services on demand. Where the grid architecture described herein can be combined with a network dispatcher, Web service invocations can be re-directed to any available hosting service in the grid having available resources. Importantly, as the provisioning determination largely can be individualized in each hosting service, and indeed in each agent in each hosting service, specialized agents can be developed to calculate provisioning decisions based upon a number of variable parameters collected from the monitors and the hosting service environment. Finally, the grid infrastructure can be extended to implement more autonomic behavior, such as self-recovery in the event of a failure in any one hosting component.

IV. Differentiated Government of the Autonomic Characteristics of the Grid

As cross-enterprise technologies such as the grid architecture and hosting services environment of the present invention adopt autonomic principals, the need will arise to leverage business rules to govern the self-adapting nature of computing systems. To address this need, the present invention can provide for the early-detection of degrading system performance which by nature of the degradation, the terms of an SLA might be violated. By anticipating the inability of the computing system to satisfy the terms of an SLA, a proactive reconfiguration of the computing system can be undertaken to remediate the anticipated failure to meet the terms of the SLA.

In one aspect of the present invention, Web services can be provisioned as a function of business rules specified according to one or more WSLAs which have been established between enterprises as WS-Policy statements. To support the provisioning of Web services as a function of business rules specified according to one or more WSLAs, pluggable agents can be provided within the hosting services of the grid. As the agents are responsible in the grid architecture of the present invention for determining whether to provision a Web service to remote hosting services, each WSLA agent can be configured with logic for identifying surges in demand. Upon identifying surges in demand, the configured WSLA agent can provision requested Web services to other hosting services able to satisfy the demand in accordance with the terms specified in the associated WSLA.

Critical to the operation of the present, the level of availability of a particular hosting service to handle new Web service invocations must be communicated to others of the hosting services in the grid. To provide this level of communicative connectivity, the grid services DNA of the present invention can be extended to include a metric which can serve as an availability gradient describing the level of availability of an associated hosting service to handle new Web service invocations. It is important to further note that the availability of a hosting service can vary widely ranging from low availability where the hosting service is unified within a single computing resource, to high where the hosting service has been distributed across multiple computing resources.

At bootstrap, the DNA interpreter described herein can utilize the gradient within the grid services DNA as a means of determining the most effective method of distributing hosting service components across multiple computing resources. Additionally, the monitors of the hosting service can be used as grid instrumentation and can acquire behaviors which are relevant to monitoring the hosted Web service. For example, as will be apparent to one skilled in the art, in some cases, after a Web service has been provisioned to a particular hosting service, the assigned monitor may be required to acquire a "routing behavior" to forward requests for the provisioned hosting service to the particular hosting service in which the Web service has been provisioned.

Figure 7:
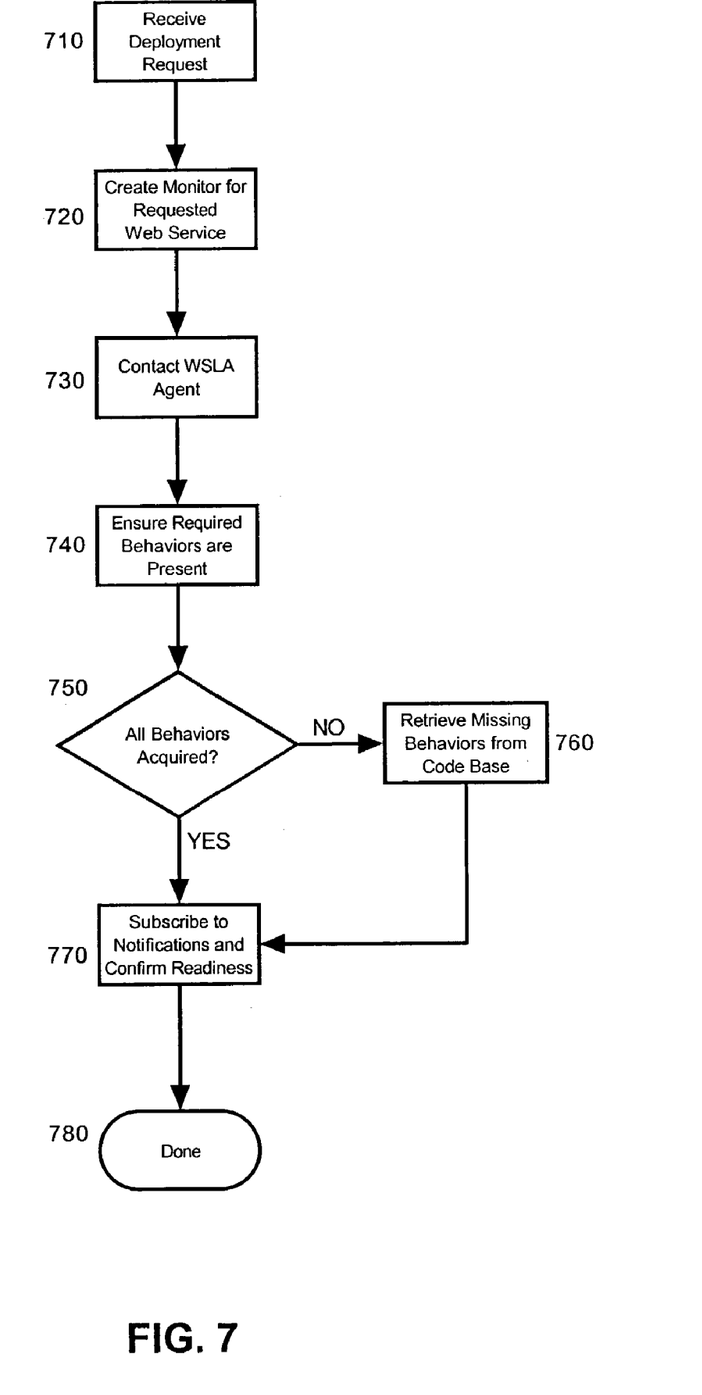
FIG. 7 is a flow chart which illustrates a deployment process which can be performed in provisioning a Web service to a remote hosting service along with suitable WSLA data from which differentiated provisioning can be determined.

FIG. 7 is a flow chart which illustrates a deployment process which can be performed in provisioning a Web service to a remote hosting service along with suitable WSLA data from which differentiated provisioning can be determined. Beginning in block 710, the deployment service can receive a request to deploy a Web service. In block 720 the deployment service can create the relevant monitors. Specifically, a WSDL document for the Web service can be inspected for WS-Policy elements. From the WS-Policy elements, any WSLAs associated with the Web service can be determined. Finally, grid instrumentation can be created for the Web service based upon measurement directives, such as a response time or a downtime directive, which are identified within the associated WSLAs.

In block 730 the deployment service can contact the WSLA agent with the WSLA information for the Web service. In block 740, the WSLA agent can check to ensure that the behaviors which are required to fulfill the obligations of the associated WSLA or WSLAs have been acquired by the Web service deployments. In decision block 750, if the behaviors have not been acquired, in block 760 the WSLA agent can contact the code base to retrieve the required behaviors. In block 770, the WLSA agent can subscribe to the necessary notifications in the grid and can confirm its readiness to participate in the grid. Finally, in block 780 the deployment service can end thus completing the deployment process.

Figure 8:
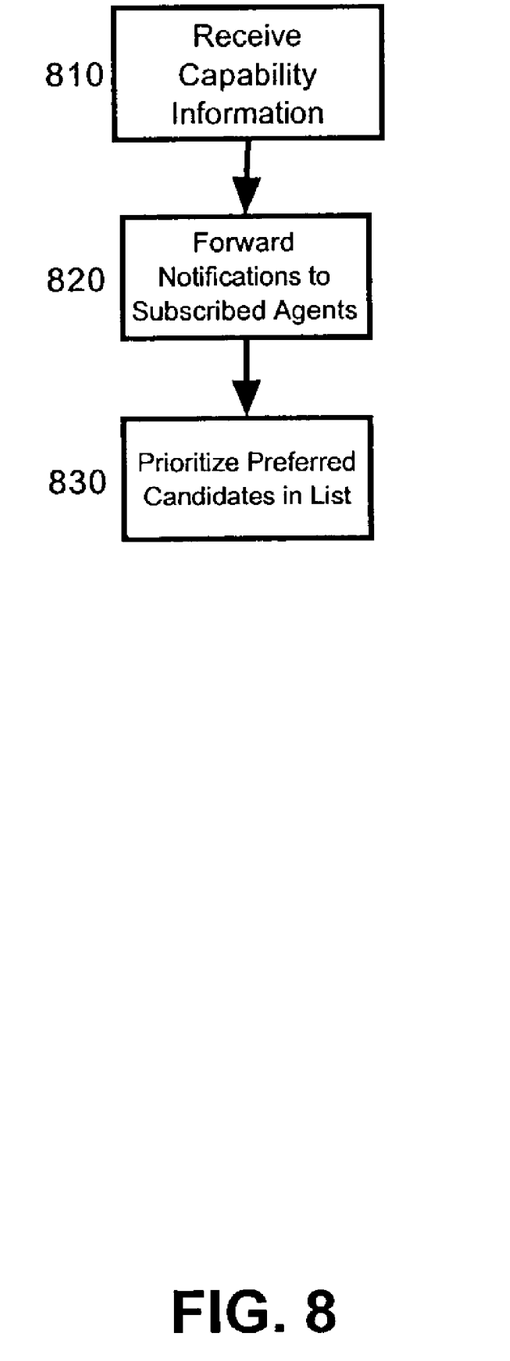
FIG. 8 is a flow chart which illustrates an exemplary candidate selection process wherein the peer hosting services are communicatively coupled according to a publish and subscribe mechanism; and, FIG. 9 is a flow chart illustrating a run-time process of detecting and responding to an impending breach of a WSLA.

Importantly, the WSLA agents can perform candidate hosting service selection based upon the published capabilities of the peer hosting services in the grid. FIG. 8 is a flow chart which illustrates an exemplary candidate selection process wherein the peer hosting services are communicatively coupled according to a publish and subscribe mechanism. Specifically, beginning in block 810, the administrator service in the hosting service can receive capability information from other hosting services through, for example, the advertisements disclosed herein. In block 820 the administrator service can forward the notifications received from other hosting services to interested agents which have subscribed to those notifications. Finally, in block 830, the agents can prioritize preferred candidates based upon the advertised capabilities, thus producing a candidate list.

Figure 9:
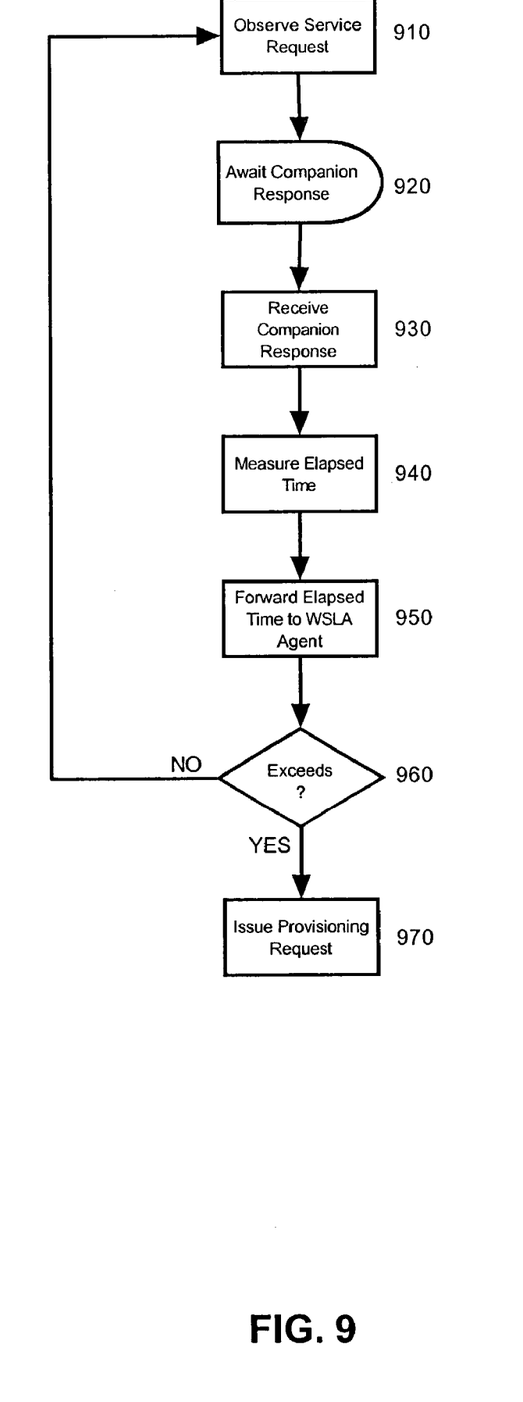

Once a candidate list has been formulated by a WSLA agent, the WSLA agent can select in order of preference particular hosting services when choosing to provision a Web service remotely. More importantly, the WSLA agent, when detecting an impending breach of the terms of a WSLA for a Web service, can utilize the candidate list to identify a particular hosting service able to better satisfy the terms of the WSLA. FIG. 9 is a flow chart illustrating a run-time process of detecting and responding to an impending breach of a WSLA.

Beginning in block 910, a service request for a monitored Web service can be observed in a response time monitor. In delay block 920, the response time monitor can await a companion response from the Web service. In block 930 the companion response can be received and in block 940, the elapsed time between request and companion response can be measured. In block 950, the elapsed time can be forwarded to an associated WSLA agent. If in decision block 960, it is determined by the WSLA agent that the elapsed time exceeds the permitted response time specified in the measurement directive of the WSLA, in block 970 the WSLA agent can issue a provisioning request for the Web service in a different hosting service according preferences specified in the candidate list.

To provide a more maintainable, scalable and deployable solution, affinity groups can be established among the hosting services of the grid architecture. In hte present invention, an affinity group can be a set of hosting services that are related to one another because the hosting services remain in physical proximity to one another, or maintain access to a shared resource. As the hosting services of an affinity group enjoy such commonalities, either geographically or logically, the hosting services in the affinity group can capitalize upon less expensive communication and storage of state with the group.

Affinity groups can be set as a function of multiple parameters, including, but not restricted to proximity, shared state storage for failure-recovery, and shared memory for improved communication. Notably, members of the affinity group, notwithstanding their membership, can communicate with hosting services outside of the affinity group. Importantly, by establishing affinity groups, the likelihood that a group of hosting services might fail together can be greatly reduced and managed more effectively. Still, the level of redundancy can be managed with consideration of business rules specified in companion WSLAs.

It will be apparent to one skilled in the art that because there are various condition evaluations in a WSLA, and because multiple instances of a hosted service can exist in the grid, agents can cooperate to fulfill the business rules embodied in the WSLA. The group of WSLA agents which cooperatively work with one another can be referred to as an agent cooperation network (ACN). When a new Web service is provisioned, the provisioning agent can contact the deployment service in the remote hosting service with initialization parameters containing the location of the agents in the ACN for the specific WSLAs which the Web service falls under, as well as where to acquire behaviors necessary to fulfill any guarantees associated with that new service.

V. Conclusion

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An autonomic grid, comprising:
a plurality of interconnected computer systems, comprising a plurality of hosting services communicatively coupled to one another, each local one of the hosting services comprising:
an administrative service configured both to communicate capability information about the local hosting service to others of the hosting services, and also to determine whether to deploy requested Web Services locally or remotely,
wherein the administrative service is further configured to:
detect in the local hosting service a request to invoke a Web service instance;
responsive to the detection, determine in the local hosting service whether to permit the invocation in said local hosting service, or to provision the requested Web Service instance in a peer hosting service, the determining includes:
measuring performance metrics for the requested Web Service instances; comparing the measured metrics to specified metrics in a corresponding Web Service Level Agreement (WSLA); computing based upon the comparison whether the requested Web Service instance has an operable performance likely to breach terms of the WSLA; and, if it is determined that the requested Web Service instance has an operable performance likely to breach the terms of the WSLA, provisioning the requested Web Service instance in a hosting service deemed likely to have an operable performance not likely to breach terms of said WSLA; and, if it is determined to provision the requested Web Service instance in a peer hosting service, select a peer hosting service and request that the selected peer hosting service deploy the requested Web Service instance in the selected peer hosting service,
a grid services Distributed Network Agreement (DNA) in which a plurality of grid services DNA documents are stored said grid services DNA documents providing information required to recreate corresponding hosting services; and,
a grid services Distributed Network Agreement (DNA) interpreter configured to couple individual ones of said grid services DNA documents of said corresponding hosting services in order to perform self-healing of said corresponding hosting services.

2. The autonomic grid of claim 1, wherein at least one of said hosting services further comprises an advertising service configured to advertise to others of said hosting services the capabilities of said at least one of said hosting services.

3. The autonomic grid of claim 2, wherein said advertising service is included as part of said administrative service.

4. The autonomic grid of claim 2, wherein at least one of said agents comprises a Web service level agreement (WSLA) agent configured to provision individual ones of said Web services in particular ones of said hosting services according to the terms of at least one WSLA associated with said individual ones of said Web services.

5. The autonomic grid of claim 1, wherein said Web services are wrapped with grid service instrumentation, said grid service instrumentation providing subscription and notification functionality to said wrapped Web services.

6. The autonomic grid of claim 1, wherein each local hosting service further comprises:
   a code base for storing implementations of the requested Web services; and,
   a deployment service configured to deploy on command the implementations stored in the code base.

7. The autonomic grid of claim 1, wherein at least one of the hosting services further comprises:
   a plurality of Web services instances;
   a plurality of monitors configured to proxy requests to and responses from said Web services instances; and,
   a plurality of agents subscribed to said monitors to analyze said requests to and responses from said Web services instances, and to provision Web services in others of said hosting services based upon said analysis.

8. A method of deploying a Web service in an autonomic grid including a plurality of hosting services communicatively coupled to one another, the method comprising the steps of:
   detecting in a local hosting service a request to invoke a Web service instance;
   responsive to said detection, determining in said local hosting service whether to permit said invocation in said local hosting service, or to provision said requested Web Service instance in a peer hosting service, the determining includes:
      measuring performance metrics for the requested Web Service instances; comparing the measured metrics to specified metrics in a corresponding Web Service Level Agreement (WSLA); computing based upon the comparison whether the requested Web Service instance has an operable performance likely to breach terms of the WSLA; and, if it is determined that the requested Web Service instance has an operable performance likely to breach the terms of the WSLA, provisioning the requested Web Service instance in a hosting service deemed likely to have an operable performance not likely to breach terms of said WSLA; and, if it is determined to provision said requested Web Service instance in a peer hosting service, selecting a peer hosting service and requesting that said selected peer hosting service deploy said requested Web Service instance in said selected peer hosting service,
   a grid services Distributed Network Agreement (DNA) in which a plurality of grid services DNA documents are stored said grid services DNA documents providing information required to recreate corresponding hosting services; and,
   a grid services Distributed Network Agreement (DNA) interpreter configured to couple individual ones of said grid services DNA documents of said corresponding hosting services in order to perform self-healing of said corresponding hosting services.

9. The method of claim 8, wherein said detecting step comprises the steps of:
   coupling a monitor associated with a Web service instance to an agent configured to perform said determining, selecting and requesting steps; and,
   detecting a request to invoke said Web service instance in said monitor and notifying said coupled agent of said detection.

10. The method of claim 8, wherein said selecting step comprises the steps of:
    monitoring capability assertions received from peer hosting services in the grid;
    evaluating said assertions against criteria established for model hosting services; and,
    creating a candidate list of peer hosting services based upon said evaluation.

11. A machine readable storage device having stored thereon a computer program for deploying a Web service in an autonomic grid including a plurality of hosting services communicatively coupled to one another, the computer program comprising a routine set of instructions which when executed cause the machine to perform the steps of:
    detecting in a local hosting service a request to invoke a Web service instance;
    responsive to said detection, determining in said local hosting service whether to permit said invocation in said local hosting service, or to provision said requested Web Service instance in a peer hosting service, the determining includes:
       measuring performance metrics for the requested Web Service instances; comparing the measured metrics to specified metrics in a corresponding Web Service Level Agreement (WSLA); computing based upon the comparison whether the requested Web Service instance has an operable performance likely to breach terms of the WSLA; and, if it is determined that the requested Web Service instance has an operable performance likely to breach the terms of the WSLA, provisioning the requested Web Service instance in a hosting service deemed likely to have an operable performance not likely to breach terms of said WSLA; and, if it is determined to provision said requested Web Service instance in a peer hosting service, selecting a peer hosting service and requesting that said selected peer hosting service deploy said requested Web Service instance in said selected peer hosting service,
    a grid services Distributed Network Agreement (DNA) in which a plurality of grid services DNA documents are stored said grid services DNA documents providing information required to recreate corresponding hosting services; and,
    a grid services Distributed Network Agreement (DNA) interpreter configured to couple individual ones of said grid services DNA documents of said corresponding hosting services in order to perform self-healing of said corresponding hosting services.

12. The machine readable storage of claim 11, wherein said detecting step comprises the steps of:
    coupling a monitor associated with a Web service instance to an agent configured to perform said determining, selecting and requesting steps; and,
    detecting a request to invoke said Web service instance in said monitor and notifying said coupled agent of said detection.

13. The machine readable storage device of claim 12, wherein said selecting step comprises the steps of:
    monitoring capability assertions received from peer hosting services in the grid; evaluating said assertions against criteria established for model hosting services; and, creating a candidate list of peer hosting services based upon said evaluation.

* * * * *